(12) United States Patent
Cofre Luna et al.

(10) Patent No.: US 8,958,671 B2
(45) Date of Patent: Feb. 17, 2015

(54) CABLE COMPRISING A LAYER ABLE TO EMIT LIGHT RADIATION

(75) Inventors: Jorge Antonio Cofre Luna, Santiago (CL); Jorge Villablanca, Santiago (CL); Fernando Munoz, Santiago (CL)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/265,431

(22) PCT Filed: Dec. 3, 2009

(86) PCT No.: PCT/IB2009/056024
§ 371 (c)(1),
(2), (4) Date: Dec. 29, 2011

(87) PCT Pub. No.: WO2010/131084
PCT Pub. Date: Nov. 18, 2010

(65) Prior Publication Data
US 2012/0099824 A1    Apr. 26, 2012

(51) Int. Cl.
*G02B 6/44* (2006.01)
*F21V 8/00* (2006.01)
*H01B 3/30* (2006.01)
*H01B 7/36* (2006.01)
*H01B 7/18* (2006.01)

(52) U.S. Cl.
CPC ............ *G02B 6/4482* (2013.01); *G02B 6/0003* (2013.01); *H01B 3/302* (2013.01); *H01B 7/361* (2013.01); *G02B 6/4416* (2013.01); *H01B 7/1875* (2013.01)
USPC .......................................... 385/100; 385/101

(58) Field of Classification Search
USPC .................................................. 385/100, 101
See application file for complete search history.

(56) References Cited

U.S. PATENT DOCUMENTS

| 4,140,114 | A | * | 2/1979 | Moore et al. ............. 128/201.19 |
| 5,639,527 | A | | 6/1997 | Hurwitz |
| 5,646,400 | A | * | 7/1997 | Perez et al. ............... 250/227.18 |
| 6,646,206 | B2 | * | 11/2003 | Ryeczek ......................... 174/112 |
| 8,045,833 | B2 | * | 10/2011 | Wasserman et al. .......... 385/101 |
| 2004/0144558 | A1 | | 7/2004 | Zhengkai et al. |
| 2004/0156609 | A1 | * | 8/2004 | Lanier et al. ................... 385/128 |
| 2006/0285350 | A1 | * | 12/2006 | Wang ............................. 362/555 |

FOREIGN PATENT DOCUMENTS

| DE | 3604311 | A1 | | 8/1987 |
| DE | 9211949 | | | 12/1992 |
| GB | 2409516 | A | * | 6/2005 |
| GB | 2433645 | | | 6/2007 |

(Continued)

OTHER PUBLICATIONS

International Search Report dated Mar. 9, 2011.

(Continued)

*Primary Examiner* — Ellen Kim
(74) *Attorney, Agent, or Firm* — Sofer & Haroun, LLP

(57) ABSTRACT

A power and/or telecommunication cable (Ia,Ib) includes one or several conductor elements (10,20,30) surrounded by an outer sheath, where the outer sheath (40,50) comprising a first layer (40a, 40b) able to emit light radiation, and a second layer (50) made of a light transmitting thermoplastic polyurethane (TPU) material surrounding the first layer (40a, 40b), so that h first layer (40a, 40b) is visible through the second layer (50).

26 Claims, 2 Drawing Sheets

(56) References Cited

FOREIGN PATENT DOCUMENTS

| JP | 2000123644 | 4/2000 |
| KR | 2006005967 | 1/2006 |
| WO | 0030126 | 5/2000 |

OTHER PUBLICATIONS

"Shine Little Glow-Worm, Glimmer Glimmer".
Portable and power feeder cables for use in mines and similar applications (ICEA) Dated 2008.

* cited by examiner

CABLE COMPRISING A LAYER ABLE TO EMIT LIGHT RADIATION

RELATED APPLICATION

This application is a National Phase application of PCT/IB2009/056024, filed on Dec. 3, 2009, which in turn claims the benefit of priority from U.S. patent application Ser. No. 12/463,778, filed on May 11, 2009, the entirety of which are incorporated herein by reference.

BACKGROUND

1. Field of the Invention

The present invention relates to a power and/or telecommunication cable comprising a layer able to emit light radiation.

More particularly, the power and/or telecommunication cable is used in mines and similar applications such as severe abrasion and dark environment.

2. Description of Related Art

A conventional power or telecommunication cable includes one or more conductor elements, especially insulated conductor elements, with a protective outer sheath. An electrical power cable is typically constructed with conductor elements formed of copper wire for efficiently conducting electrical power on whatever scale is desired. A telecommunication cable is typically constructed of relatively small wire conductor elements for conducting electrical signals and/or fiber-optic strands for conducting optical signals.

Power and telecommunication cables are used in many environments. One of the harshest environments for cables is mining operations in dark environment, In particular, the cables used in mining operations tend to be subjected to severe abrasion due to equipment, traffic, and mining materials moving over or along the mining cable. In addition, the lack of cable visibility in said dark environment frequently produces cable crushing or abrasive wearing by the mining trucks and the shovel machines.

Technical solutions already exist to visualize the cable so that the cable is less subjected to severe abrasion. In this respect, two variants are well-known The first variant consists in using an outer sheath such as an outer rubber sheath pigmented with a fluorescent pigment. However, said outer sheath presents low durability of the fluorescent pigments due to direct exposure to the ground, air, water and UV light.

The second variant is to case a reflective tape helically wrapped over the outer sheath of the cable. However, said additional reflective tape risks to be easily destructed due to severe use in mining conditions.

OBJECTS AND SUMMARY

The present invention seeks to solve the above-mentioned problems of the prior art, and proposes a cable showing both high abrasion resistance and a good visibility in dark environment, more particularly in outdoor dark environment.

To this end, an object of the present invention is to provide a poi power and/or telecommunication cable including one or several conductor elements surrounded by an outer sheath, wherein said outer sheath comprising :

a first layer able to emit light radiation, and
a second layer made of a light transmitting thermoplastic polyurethane (TPU) material surrounding the first layer, so that the first layer is visible through the second layer, and preferably the second layer is the outer most layer of the cable.

More particularly, the first layer can be visible through the second layer in dark environment in emitting light radiation.

The first layer can typically be a tape wrapped helically around the conductor element (wrapped tape) a layer extruded around the conductor elements (extruded layer).

One understands by the expression "a first layer able to emit light radiation", a layer which can directly or indirectly emit light radiation, especially visible light radii on. The tern "directly" means that the radiation light is emitted from the first layer as such. The term "indirectly" means that the radiation light is emitted by the first layer, but from the intermediate of an external light radiation source.

In a first embodiment, the first layer is made of a luminescent material. The luminescent material allows to directly emit light. Said light does not derive energy from the temperature of the emitting material.

The luminescent material can be selected among a fluorescent material, a phosphorescent material, and a bioluminescent material, or a mixture thereof.

Preferably a fluorescent material is used. The fluorescent material of the first layer absorbs light in order to emit light in dark environment. So, once the cable according to the invention is exposed with light, it able to emit light in dark environment. For example, positioning in outdoor environment, the cable can be energized with sunlight during the day and emit the absorbed light during the night.

In a first example, when the first layer is a tape, the outer surface of the tape is coated with fluorescent ink.

For example, the tape material as such is selected among cotton fabric, crosslinked acrylic compound on polyester/nylon substrate and other appropriate fabrics.

In a second example, when the first layer is an extruded layer, the extruded layer is made of a thermoplastic polymer including fluorescent pigments.

In a second embodiment, e first layer is made of a reflective material. The reflective material allows to indirectly e it light. Indeed, the reflective material is a surface on which a light, coming from a external source (e.g. car light), is reflected on its surface.

The reflective material is preferably a tape, chic h can be cased alone or wrapped helicoidally and alternatively with a colored binder tape well-known in the art, The reflective material can be a silvered reflective tape.

This second embodiment is especially suited for indoor dark environments like underground mines.

In a third embodiment, the first layer is made of a luminescent material and of a reflective material, both materials being already described previously More particularly, the first layer can comprise a tape of luminescent material wrapped helicoidally and alternatively around the conductor element with a tape of a reflective material.

The light transmitting material is such that the first layer can be visually seen through the second layer as if there as substantially no intervening material. By way of example, a material which transmits light can be a translucent material or a transparent material.

One understands that the second layer made of trans transmitting T material is a light transmitting layer.

The second layer made of a light transmitting TPU material can be an extruded TPU layer, which is Obtained by an extrusion process well-known in the art.

In a specific embodiment, the TPU material (i.e. second layer) can be crosslinked. Crosslinking processes are well-known in the art and one example can be to crosslink the TPU material in presence of X-radiation.

The second layer can further comprise at least one flame retardant filler selected among triphenylphosphate, tertbutylphenyl diphenyl phosphate and tertbutylated diphenyl phosphate, or mixtures thereof, to obtain a flame retardant layer, and more particularly a halogen free flame retardant JIFF second layer. Said flame retardant filler does advantageously not affect transparency of said second layer.

The obtained second layer can therefore be a transparent HFFR extra heavy duty thermoplastic polyurethane jacket.

According to the invention, the first and the second layers of t le outer sheath allows advantageously to provide a very resistant outer sheath which is visible in dark environment.

In addition, the cable according to the invention satisfies to the ICEA S-75-381-2008 standard concerning "Portable and power feeder cables for use in mines and similar applications".

In a first variant, the second layer cal be directly in contact with the first layer, or in other terms, there is no intermediate layer positioned between the first layer and the second layer.

In a second variant, the cable further comprises an intermediate layer along the cable between the first layer and the second layer, so that the first layer is visible through the intermediate layer.

In this respect, said intermediate layer can be a reinforcing open material and/or can be made from a light transmitting material.

For example, the reinforcing open material can be an open mesh such as threads used as double serving.

The light transmitting material can be a non-extruded layer covering the whole surface of the first layer, such as a tape, and more particularly a polyester tape, wrapped helically around the first layer.

Said light transmitting material as intermediate layer is more particularly suitable when the first layer is a reflective tape, and more especially a silvered reflective tape. Indeed, the extrusion of TPU layer directly around a reflective tape aims at damaging the micro-crystal structure of the reflective tape since the applicant noticed that in this case, the reflective tape lost its reflectance properties.

The thickness of the second layer as well as the nature and quantity of fillers in the material of second layer is such as the second layer keeps substantially a sufficient transparency to visualize the light radiation emitting material in dark environment, in this respect, the man skilled in the art is able to perform trials to find the optimum or workable second layer by routine experimentations. The same conditions apply to the intermediate layer when it is used.

BRIEF DESCRIPTION OF THE DRAWINGS

The present invention will become more fully understood from the detailed description given herein below and from the accompanying drawings which are given by way of illustration only, and thus, which are not limits of the present invention, and wherein.

These two embodiments are favorable for use in dark environment, especially as a mining cable.

For reasons of clarity, the same elements are designed by identical references. Similarly, only those elements that are essential for understanding the invention are shown in diagrammatic manner, and scale is not complied with.

DETAILED DESCRIPTION

Figure 1:
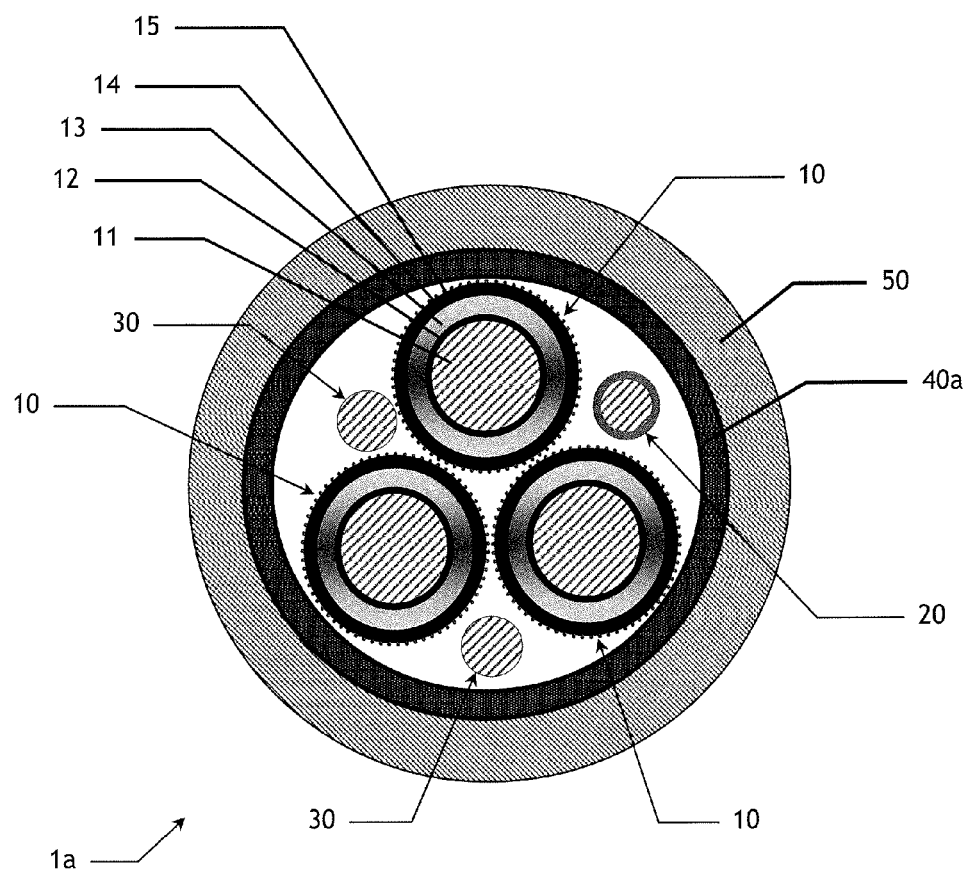
FIG. 1 represents a schematic cross-sectional view of a first embodiment of a cable according to the invention.

Referring to FIG. 1, the cable Ia includes a plurality of conductor elements 10,20,30, said plurality of elements being surrounded by an outer protective sheath 40a, 50 according to the invention. Said cable schematically illustrates a SHD, shielded round three-conductor cables (5001 to 25000 Volts) according to ICEA S-75-381-2008 standard, part 3.10.3.3.

The insulated conductor elements comprise three power insulated conductors 10, and one ground check insulated conductor 20. The cable further comprises two grounded uninsulated conductors 30. A power insulated conductor 10 is for example composed of a plurality of stranded conductor wires 11 surrounded successively by a first semiconductor layer 12, a dielectric insulation 13, a second semiconductor layer 14, and a shield 15.

The outer protective sheath 40a, 50 is a two-layer sheath according to the invention.

The inner layer 40a is a fluorescent tape wrapped around the conductor elements 10,20,30. An extruded outer layer 50 of light transmitting thermoplastic polyurethane surrounds said inner layer 40a, the outer layer 50 being directly in contact with the inner layer 40 in order to see visually the inner layer through the outer layer, especially in a dark environment.

In addition, the cable according to the invention can comprise a reinforcing open material such as nylon threads (not represented) between the inner layer and the outer layer.

The cable represented on FIG. 1 is manufactured such as the power insulated conductors 10, the ground check insulated conductor 20 and the grounding uninsulated conductors 30 are gathered to form an assembly. Then, the inner layer 40a, and eventually the reinforcing nylon threads, are applied over said assembly. Finally, a light transmitting thermoplastic polyurethane material is extruded around the fluorescent tape, or around the reinforcing nylon threads if existed, to form the outer layer 50 of the outer sheath.

In this example, the fluorescent tape is commercialized by Loypos under the reference Fluorescent Tape, said tape having a thickness of about 0.20 mm. The light transmitting thermoplastic polyurethane material is commercialized by Lubrizol under the reference Estane ZHF 80AT3 NAT 021 or by AlphaGary under the reference Irogran A78P 4766NM, the extruded thermoplastic polyurethane layer having a thickness of about 7.5 mm. The reinforcing nylon threads are commercialized by Synthetic Thread Co Inc., under the reference Nylon 1050/3 Ply Preshrunk. The outer sheath according to the invention can be defined according to outer sheath thickness in the part 321.2 of ICEA S-75-381-2008 standard, and according to cable outside diameters in the part 3.22 of ICEA S-75-381-2008 standard. The additional threads between the two layers of the outer sheath are provided according part 3.21.2 of ICEA S-75-381-2008 standard.

Figure 2:
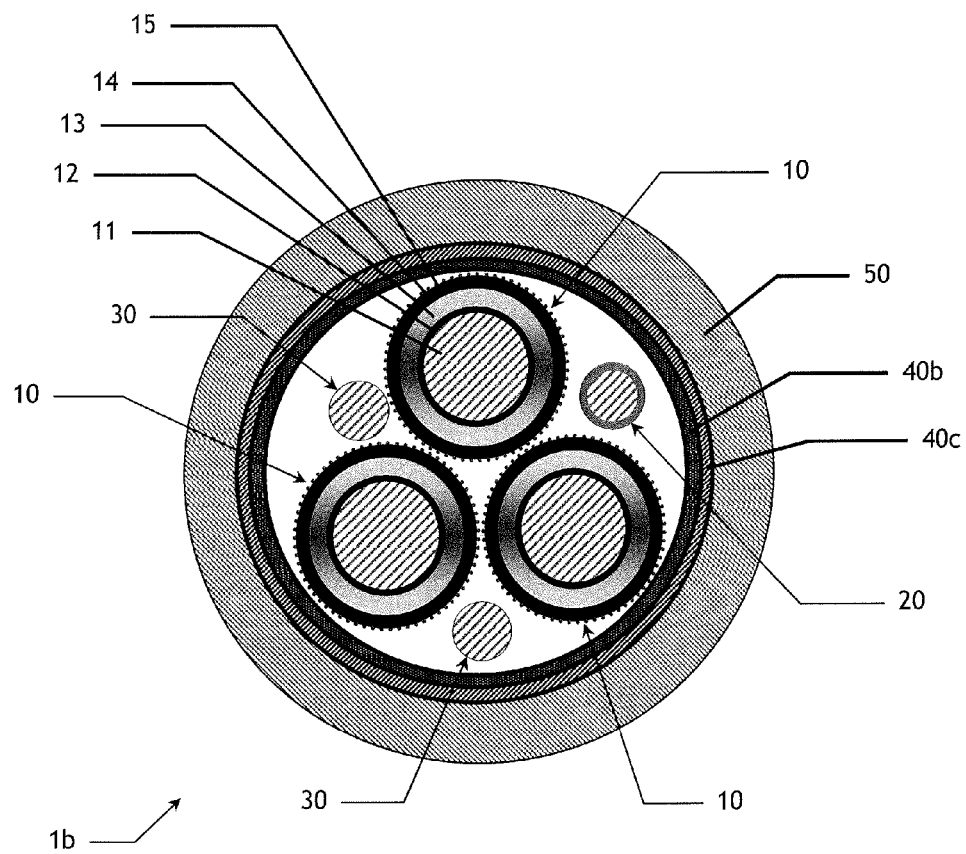
FIG. 2 represents a schematic cross-sectional view of a second embodiment of a cable according to the invention.

FIG. 2 represents a same type of cable as described in FIG. 1, except that the outer sheath is related to another embodiment of the invention.

More particularly, the cable Ib includes a plurality of conductor elements 10,20,30, said plurality of elements being surrounded by an outer protective sheath 40b,40c,50 according to the invention.

The outer protective sheath 40b,40c,50 is a three-layer sheath according to the invention.

The inner layer 40b is a reflective tape wrapped around the conductor elements. An intermediate layer 40c, which is a light transmitting polyester tape, is wrapped around said inner layer 40b, said intermediate layer 40c being directly in contact with said inner layer 40b.

An extruded outer layer 50 of light transmitting thermoplastic polyurethane surrounds said intermediate layer 40c, the outer layer 50 being directly in contact with the intermediate layer 40c so that the inner layer 40b is visible through the outer layer 50 and through the intermediate layer 40c, especially in a dark environment.

In this example, the reflective tape is commercialized by HUATP LIMITED under the reference H-F 0101, said tape having a thickness of about 0.20 mm. The intermediate tape is commercialized by Gareware polyester Limited under the reference ERE 36, said tape having a thickness of about 36 micrometer. The light transmitting thermoplastic polyurethane material is commercialized by Lubrizol under the reference Estane Ziff 80AT3 NAT 021 or by AlphaGary under the reference Irogran A78P 4766NM, the extruded thermoplastic polyurethane layer having a thickness of about 7.5 mm.

The cables as represented by FIGS. 1 and 2 illustrate cable having a circular cross section. However, the circular cross section is given by way of illustration, and thus other forms can be considered such as for example a flat cross section.

The invention claimed is:

1. Power and/or telecommunication cable including one or several conductor elements surrounded by an outer sheath, at least one of said conductor element being an electrical conductor, wherein said outer sheath comprising:
   a first layer able to emit light radiation, and
   a second layer made of a light transmitting thermoplastic polyurethane material surrounding the first layer, so that the first layer is visible through the second layer, the second layer being different from the first layer.

2. Cable according to claim 1, wherein the first layer is a wrapped tape or an extruded layer.

3. Cable according to claim 2, wherein the outer surface of the tape is coated with fluorescent ink.

4. Cable according to claim 2, wherein the extruded layer is made of a thermoplastic polymer including fluorescent pigments.

5. Cable according to claim 1, wherein the first layer is made of a reflective material.

6. Cable according to claims 2, wherein the reflective material is a silvered reflective tape.

7. Cable according to claim 2, wherein the first layer is made of a luminescent material and of a reflective material.

8. Cable according to claim 7, wherein the first layer comprises a tape of luminescent material wrapped helicoidally and alternatively around the conductor element with a tape of a reflective material.

9. Cable according to claim 1, wherein the second layer is an extruded TPU layer.

10. Cable according to claim 1, wherein the second layer is crosslinked.

11. Cable according to claim 1, wherein the second layer further comprises at least one flame retardant filler.

12. Cable according to claim 1, wherein the second layer is directly in contact with the first layer.

13. Cable according to claim 1, wherein it further comprises an intermediate layer along the cable between the first layer and the second layer, so that the first layer is visible through the intermediate layer.

14. Cable according to claim 13, wherein the intermediate layer is a non-extruded layer.

15. Cable according to claim 13, wherein the intermediate layer is a polyester tape.

16. Power and/or telecommunication cable according to claim 1, wherein the conductor element includes at least one insulated conductor element.

17. Power and/or telecommunication cable according to claim 1, wherein said cable is able to be subjected to severe abrasion, so that the weight loss according to ASTM D3389 is up to 16 mg.

18. Power and/or telecommunication cable according to claim 1, wherein the cable is a shielded cable 5,001 to 25,000 Volts.

19. Power and/or telecommunication cable according to claim 1, wherein the second layer is only a light transmitting layer.

20. Power and/or telecommunication cable according to claim 1, wherein the cable is a SEID-GC round three conductor cable according to ICEA S-75-381-2008 part 3.10.3.3 standard.

21. Power and/or telecommunication cable including one or several conductor elements surrounded by an outer sheath, at least one of said conductor elements being an electrical conductor, wherein said outer sheath comprising:
   a first layer able to emit light radiation, and
   a second layer made of a light transmitting thermoplastic polyurethane material surrounding the first layer, so that the first layer is visible through the second layer, the second layer being different from the first layer.

22. The power and/or telecommunication cable according to claim 21, wherein the cable includes at least two conductor elements.

23. The Power and/or telecommunication cable according to claim 21, wherein the electric conductor is a power insulated conductor comprising one conductor element surrounded successively by a first semiconductor layer, a dielectric insulation, and a second semiconductor layer.

24. Power and/or telecommunication cable according to claim 21, wherein the cable further includes one ground check insulated conductor.

25. Power and/or telecommunication cable according to claim 21, wherein the cable further includes at least one grounded uninsulated conductor.

26. Power and/or telecommunication cable, including at least two conductor elements, said conductor elements being surrounded by an outer sheath, wherein said outer sheath comprising:
   a first layer able to emit light radiation, and
   a second layer made of a light transmitting thermoplastic polyurethane (TPU) material surrounding the first layer, so that the first layer is visible through the second layer, the second layer being different from the first layer, and wherein the conductor elements include at least one power insulated conductor and/or at least one optical signal conductor.

\* \* \* \* \*

UNITED STATES PATENT AND TRADEMARK OFFICE
CERTIFICATE OF CORRECTION

| | | |
|---|---|---|
| PATENT NO. | : 8,958,671 B2 | Page 1 of 1 |
| APPLICATION NO. | : 13/265431 | |
| DATED | : February 17, 2015 | |
| INVENTOR(S) | : Cofre Luna et al. | |

It is certified that error appears in the above-identified patent and that said Letters Patent is hereby corrected as shown below:

In the Claims

Column 5, Claim 1, Line 30: "a first layer able to emit light radiation, and" should read as "a first layer made of a fluorescent material, and"

Column 6, Claim 20, Line 22: The acronym "SEID-GC" should read as "SHD-GC"

Signed and Sealed this
Twenty-sixth Day of May, 2015

Michelle K. Lee
*Director of the United States Patent and Trademark Office*